No. 744,725. PATENTED NOV. 24, 1903.
J. DANGERFIELD.
TOOL HOLDER.
APPLICATION FILED DEC. 21, 1901.
NO MODEL.
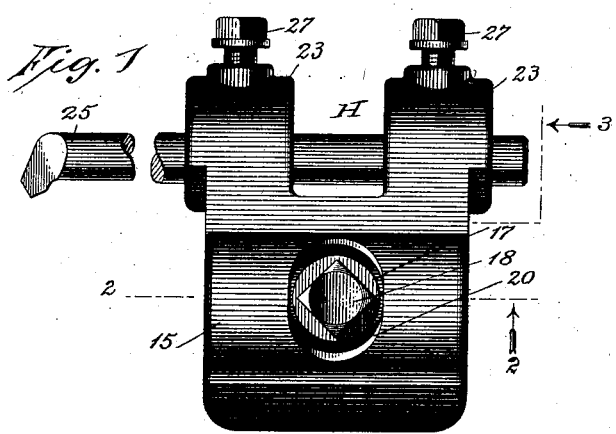
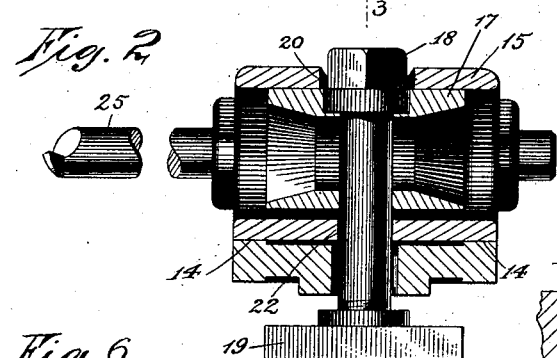
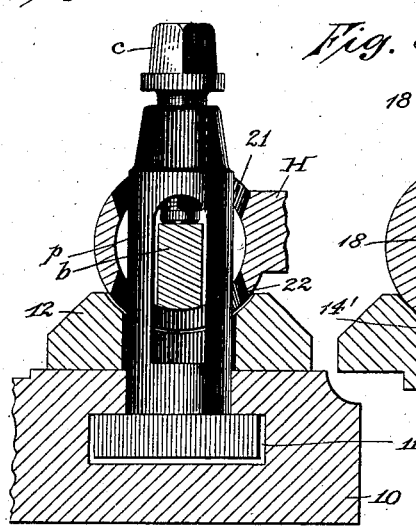
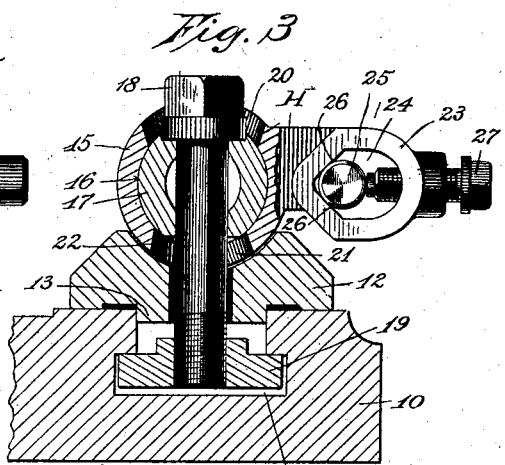
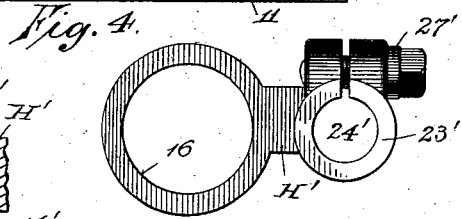
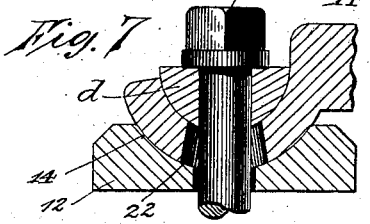
Witnesses:
C. E. Buckland
Jos. McNulty
Inventor:
Jas. Dangerfield
By his Attorney
Chas. I. Schmelz No. 744,725. Patented November 24, 1903.

UNITED STATES PATENT OFFICE.

JAMES DANGERFIELD, OF HARTFORD, CONNECTICUT.

TOOL-HOLDER.

SPECIFICATION forming part of Letters Patent No. 744,725, dated November 24, 1903.

Application filed December 21, 1901. Serial No. 86,751. (No model.)

*To all whom it may concern:*

Be it known that I, JAMES DANGERFIELD, a citizen of the United States, and a resident of Hartford, in the county of Hartford and State of Connecticut, have invented certain new and useful Improvements in Tool-Holders, of which the following is a full, clear, and exact specification.

This invention relates to tool-holders such as are ordinarily employed for receiving and maintaining boring or other cutting tools in fixed position on metal-working machines—as, for instance, in lathes, threading and tapping machines, &c.; and my invention has for one of its objects the provision of a device of this character in which the tool may be supported and firmly held, while, on the other hand, adjustment thereof in the holder may be readily accomplished and the holder itself may be positioned as required.

To this end my invention comprises a frame in which the tool may be rigidly secured and which is mounted for rotation around an axis which may be in parallelism with the working spindle of the machine and which may be deflected so as to form an angle with said axis in order to give to the cutting edge of the tool the required position relative to the work.

My invention has, furthermore, for its object the provision of means whereby said holder may be clamped to and retained on the slide-rest or other part of the metal-working machine, these means including a clamping member which is in direct engagement with the tool-carrier and which serves to force the latter against rigid supporting-faces provided therefor on a suitable base, which also constitutes an element of my improved holder and which may be clamped in position on the machine by a single bolt, as will be hereinafter described.

The particular advantages which accrue from the employment of tool-holders of the class to which my present invention belongs are well known in the art and include economy in tool-steel for the cutters and a rigid and correct positioning of the cutter relatively to the work.

In order to gain the greatest benefit as to the amount of work as well as to the quality thereof, it is essential that the cutter shall be held absolutely rigid, so that all vibration and any possible displacement of the cutter relative to the work shall be avoided, and it is the aim of my present invention to provide a tool-holder in which not only the above requirements are fulfilled, but which, furthermore, is adapted to receive tools of different sizes and shapes, any one of which may be clamped in the holder with equal facility.

In the accompanying drawings, in which similar characters denote similar parts, Figure 1 represents a top view of my improved tool-holder. Fig. 2 is a section thereof on line 2-2 of Fig. 1. Fig. 3 is a cross-section on line 3 3 of Fig. 1. Fig. 4 shows a modification of the tool-carrier, which in this instance is adapted to receive cutters of predetermined size. Figs. 5, 6, and 7 illustrate modifications in the manner of clamping the carrier in position.

Referring to the drawings, 10 denotes the tool-slide of a lathe, having the usual T-slot 11 and supporting at the upper face thereof a block or base 12, having a downwardly-projecting extension 13, whereby said base 12 may be properly positioned relatively to the slide 10. The upper surface of the base 12 is preferably concaved and provided with a pair of bearing-surfaces 14, disposed at opposite ends of said base and adapted to receive and support the fixed integral cylindrically-curved bearing portion 15 of the carrier, which is herein designated by H, said bearing portion 15 having a cylindrical bore 16, adapted to receive a correspondingly-formed clamp member 17, which for the sake of lightness may be tubular in cross-section. Means are provided for holding said carrier H on the base 12 and at the same time for frictionally retaining said carrier, base, and the clamping member 17 in position, the latter being in the present instance counterbored at its upper surface to receive the head of a clamping-bolt 18, the lower end of which is in screw-threaded engagement with a nut 19, held within the T-slot 11, above mentioned.

The carrier H is mounted for vertical rotation around the clamp member 17 and is for this reason apertured at diametrically opposite points and, as shown at 20 and 21, to clear the bolt 18, and the clamp member 17 is preferably cut away at its under side, as shown at 22, so as to prevent said member from finding a bottom-support in the concaved surface of the tool-carrier H, so that said member 17 will in reality rest only with its sides against the inner face of the carrier H and at the opposite sides of the clamp-bolt 18. It will therefore be seen that when the bolt 18 is tightened the clamp member 17 will be forced downward and the sides thereof will practically wedge themselves in place and against the inner bore of the carrier H, which in turn rests on the bearing-faces 14 thereof, as above stated.

From the foregoing it will be understood that when the clamp-bolt 18 is slightly loosened the carrier-frame H may be swung around the axis of the clamping member and in a vertical plane, so as to bring the cutter, which is held in the carrier, into the required position.

The form which I deem most desirable for a device of this class is clearly shown in Figs. 1 and 3, in which the carrier H is shown provided with a pair of ears 23, having openings 24 therein of a size sufficient to accommodate different sizes of cutters, one of which is herein shown and designated by 25.

In order to provide not only for different sizes of cutters, but also for cutters of different shapes, the openings 24 are preferably provided with a pair of bearing-faces 26, against which the cutter 25 may be forced to rest—as, for instance, by a set-screw 27.

While it is evident that when the projection 13 of base 12 enters the T-slot 11 in such a manner as to bring and hold the axis of the clamp member 17 in alinement with the tool-spindle or, more particularly speaking, in parallelism with the center line of said slot, I preferably form the projection 13 cylindrical, so that for this reason the tool-holder in its entirety and including the base 12 may be swiveled or turned in a horizontal plane, thereby varying the position of the axis of the cutter 25 relative to the axis of the working spindle. In this manner the operator will be enabled to bring the cutting-point of the tool into its best possible working position and without necessitating a reformation of the cutter.

In Fig. 4 I have illustrated a modification of the tool-carrier frame, which in this instance is designed to receive cutters of a predetermined size and which is substantially similar in construction to the carrier H, but is provided with ears 23', having openings 24' for tools which may be cylindrical in cross-section of predetermined size and which may be clamped in said ears by clamp-screws 27'.

In Figs. 5, 6, and 7 I have illustrated modifications of my improved tool-holder, viz: Fig. 5 illustrates the base 12', provided with a V-shaped groove in its upper surface, the sides of said groove forming a pair of faces 14' for the carrier H, which in this instance is forced against its seat by the clamp-bolt 18 and through the intervention of a clamp member 17' disposed on the outer surface of said carrier.

In Fig. 6 the clamping member 17 of Fig. 3 has been supplanted by a bar $b$ in conjunction with a tool-post $p$, of ordinary construction, said tool-post passing through the apertures 21 and 22 of the carrier H and being provided with a clamp-screw $c$ for forcing the carrier H downward and against its seat or the base 12.

In Fig. 7 the clamp member $d$ is shown semicylindrical in cross-section, and the upper portion of the carrier H is dispensed with without in any way altering its function or operation.

The operation of my improved tool-holder is as follows: The cutter 25 is placed within the opening 24 of the holder and adjusted to the required length by extending it beyond the ears 23 for the proper distance, according to the work in hand, and subsequently rotating it so as to bring the cutting edge into proper position, when the cutter may be clamped by means of the screws 27. The frame H may now be swung upward and downward until the cutting-point of the tool is at the proper height, when the clamping-bolt 18 may be tightened to secure and retain the holder in its adjusted position.

Having described my invention, what I claim as new, and desire to secure by Letters Patent, is—

1. The combination, with a tool-carrier mounted for partial rotation; and a base for said carrier; of a clamping member disposed within said carrier; and means for forcing said clamping member against said carrier.

2. The combination, with a tool-carrier mounted for partial rotation, and having a curved clamping-face; of a base for supporting said carrier; a cylindrical clamping member within said carrier; and means for forcing said clamping member against the carrier.

3. The combination, with a tool-carrier mounted for partial rotation, and having a fixed curved clamping-face; of a clamping member having a curved bearing-face, and having a cut-away portion at its under side; a base for supporting said carrier and having a curved bearing-face for engaging the fixed clamping-face of said carrier; and means for forcing said clamping member against the carrier.

4. The combination, with a tool-carrier mounted for partial rotation, and having a curved clamping-face; of a base for supporting said carrier; a cylindrical clamping member for engaging said carrier, and having diametrically opposite apertures, and a bolt passing through said apertures, and for forcing said clamping member against the carrier.

5. The combination, with a tool-carrier mounted for partial rotation, and having a fixed curved clamping-face; of a base for supporting said carrier, and having a curved bearing-face; a clamping member in engagement with said carrier; and means for forcing said clamping member against the carrier and for positioning said carrier on the base.

JAMES DANGERFIELD.

Witnesses:
CHAS. F. SCHMELZ,
JULIA G. MCCORMICK.